United States Patent [19]

Risser

[11] 4,324,229
[45] Apr. 13, 1982

[54] SOLAR COLLECTOR AND HEAT AND COLD GENERATOR

[76] Inventor: James A. Risser, 8244 E. Buena Terra Way, Scottsdale, Ariz. 85253

[21] Appl. No.: 95,341

[22] Filed: Nov. 19, 1979

Related U.S. Application Data

[63] Continuation-in-part of Ser. No. 855,213, Nov. 28, 1977, abandoned.

[51] Int. Cl.³ .............................................. F24J 3/02
[52] U.S. Cl. ................................... 126/439; 126/417; 126/428; 126/437; 126/450; 165/48 S
[58] Field of Search .............. 126/417, 420, 428, 430, 126/431, 435, 437, 442, 449, 450, 451; 165/48 S, 18, 170

[56] References Cited

U.S. PATENT DOCUMENTS

| | | |
|---|---|---|
| 1,003,514 | 9/1911 | Roundtree ........................ 126/438 |
| 1,242,511 | 10/1917 | Bailey ................................. 126/434 |
| 1,338,644 | 4/1920 | Arthur et al. . |
| 1,946,184 | 2/1934 | Abbot . |
| 2,122,821 | 7/1938 | Mohr . |
| 2,625,930 | 1/1953 | Harris . |
| 3,277,833 | 10/1966 | Rowekamp ...................... 414/61 R |
| 3,321,012 | 5/1967 | Herney . |
| 3,369,539 | 2/1968 | Thomason ........................... 162/432 |
| 3,563,305 | 2/1971 | Hay .................................. 126/429 X |
| 3,713,727 | 1/1973 | Markosian et al. . |
| 3,720,197 | 3/1973 | Schroth .............................. 126/451 |
| 3,994,278 | 11/1976 | Pittinger ............................ 165/53 X |
| 4,000,734 | 1/1977 | Matlock et al. . |
| 4,019,495 | 4/1977 | Frazier et al. ................... 126/437 X |
| 4,044,754 | 8/1977 | Cronin et al. ........................ 126/420 |
| 4,052,974 | 10/1977 | Vatari .................................. 165/170 |
| 4,064,867 | 12/1977 | Schlesinger . |
| 4,076,025 | 2/1978 | Parker . |
| 4,077,391 | 3/1978 | Way, Jr. ............................. 126/451 |
| 4,095,428 | 6/1978 | Warren ........................... 126/437 X |
| 4,137,901 | 2/1979 | Maier ................................. 126/439 |
| 4,144,931 | 3/1979 | Medico, Jr. ....................... 165/48 S |

Primary Examiner—Larry Jones
Attorney, Agent, or Firm—Gregory J. Nelson

[57] ABSTRACT

This invention is directed to a collector designed and positioned for installations within a predetermined range of latitudes without modification of collector position, construction, or tracking the sun's movement, and comprises a generator of hot or cold fluid by solar energy collection during the day to heat the fluid and/or chilling of the fluid at nocturnal nighttime.

10 Claims, 11 Drawing Figures

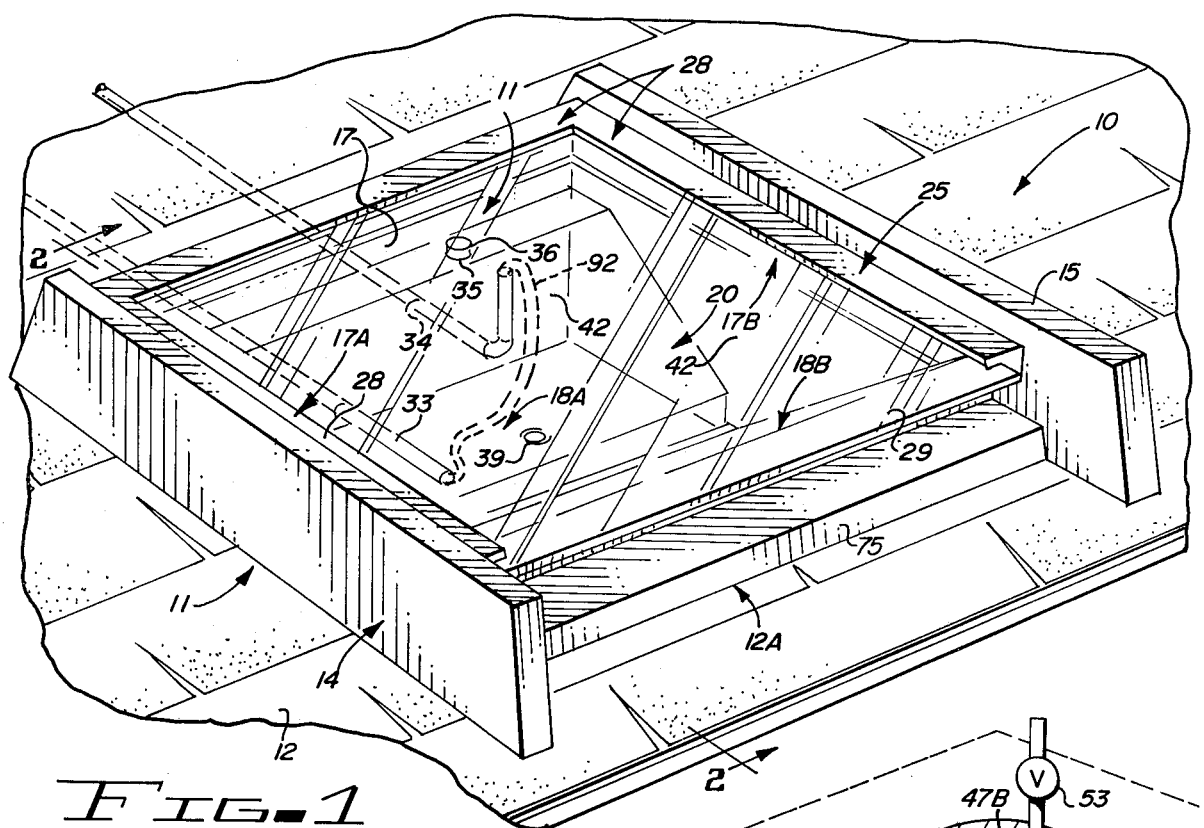

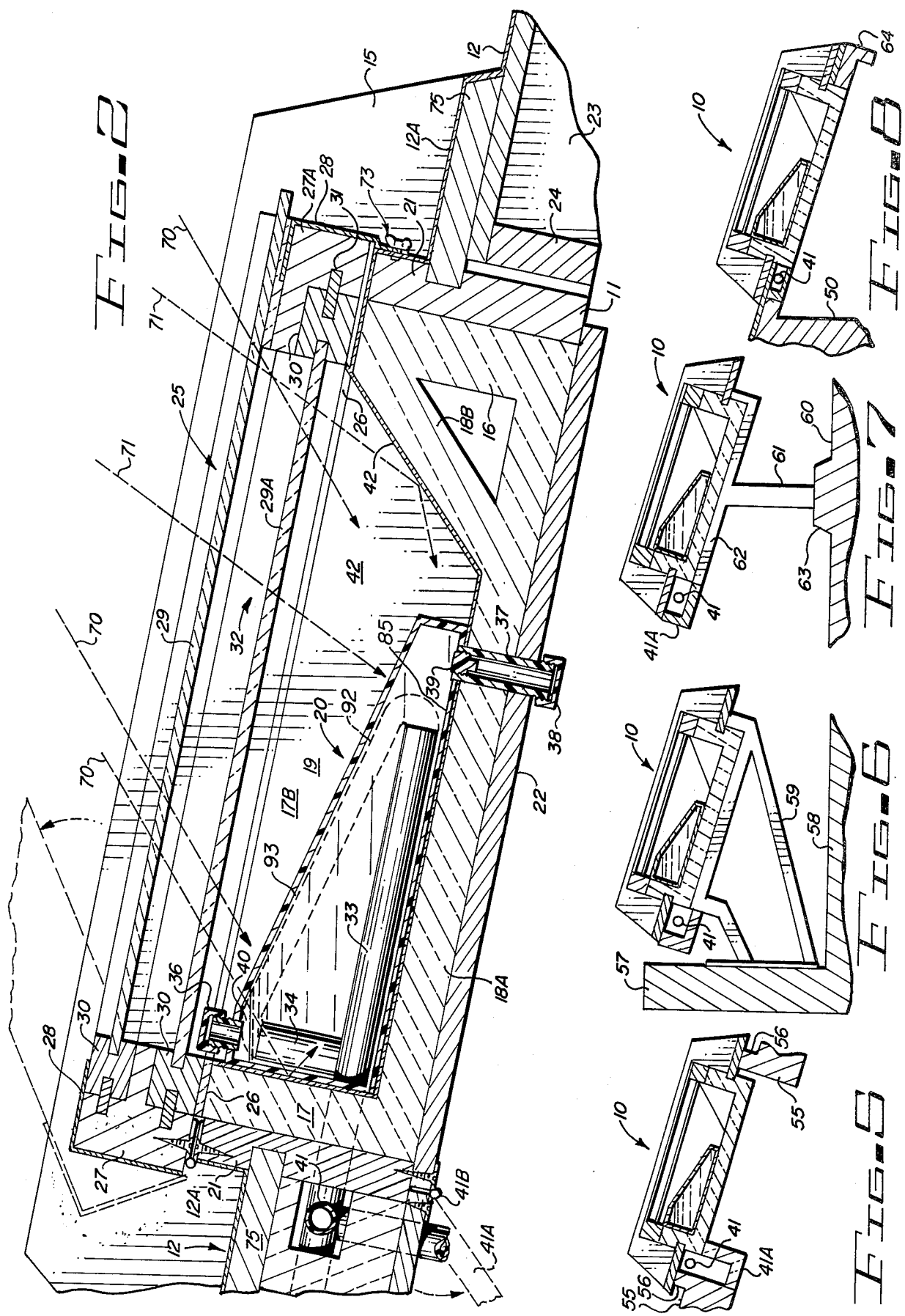

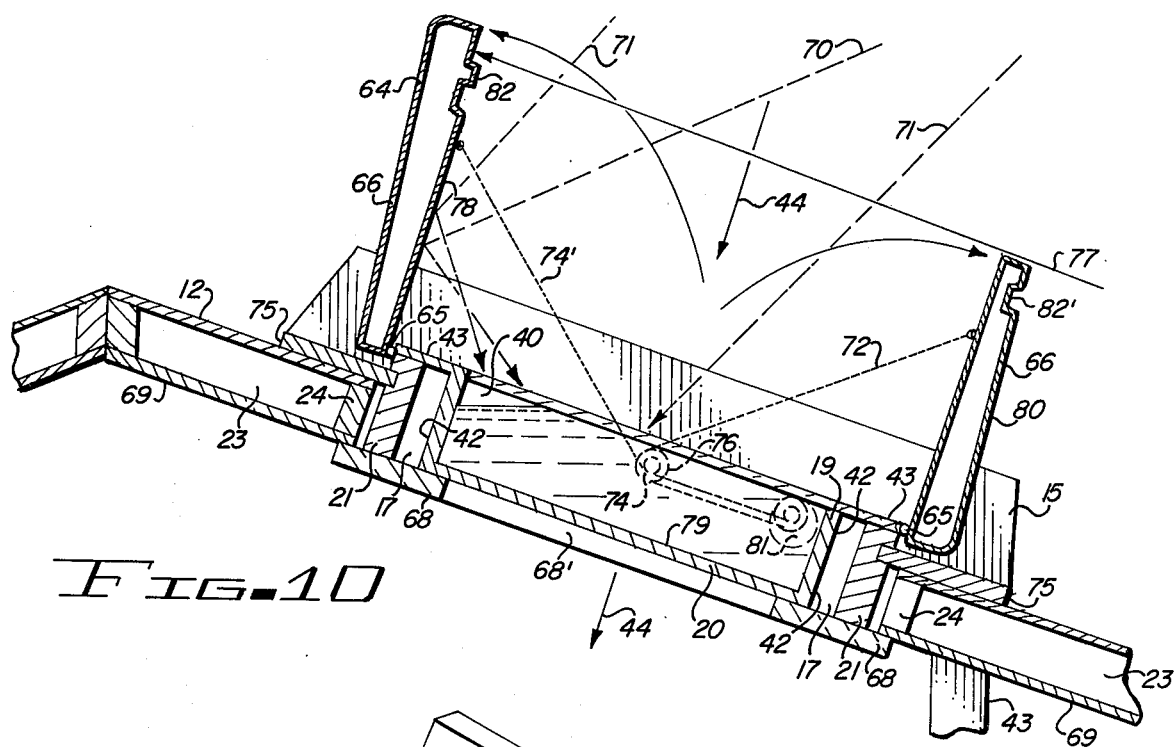
FIG-10
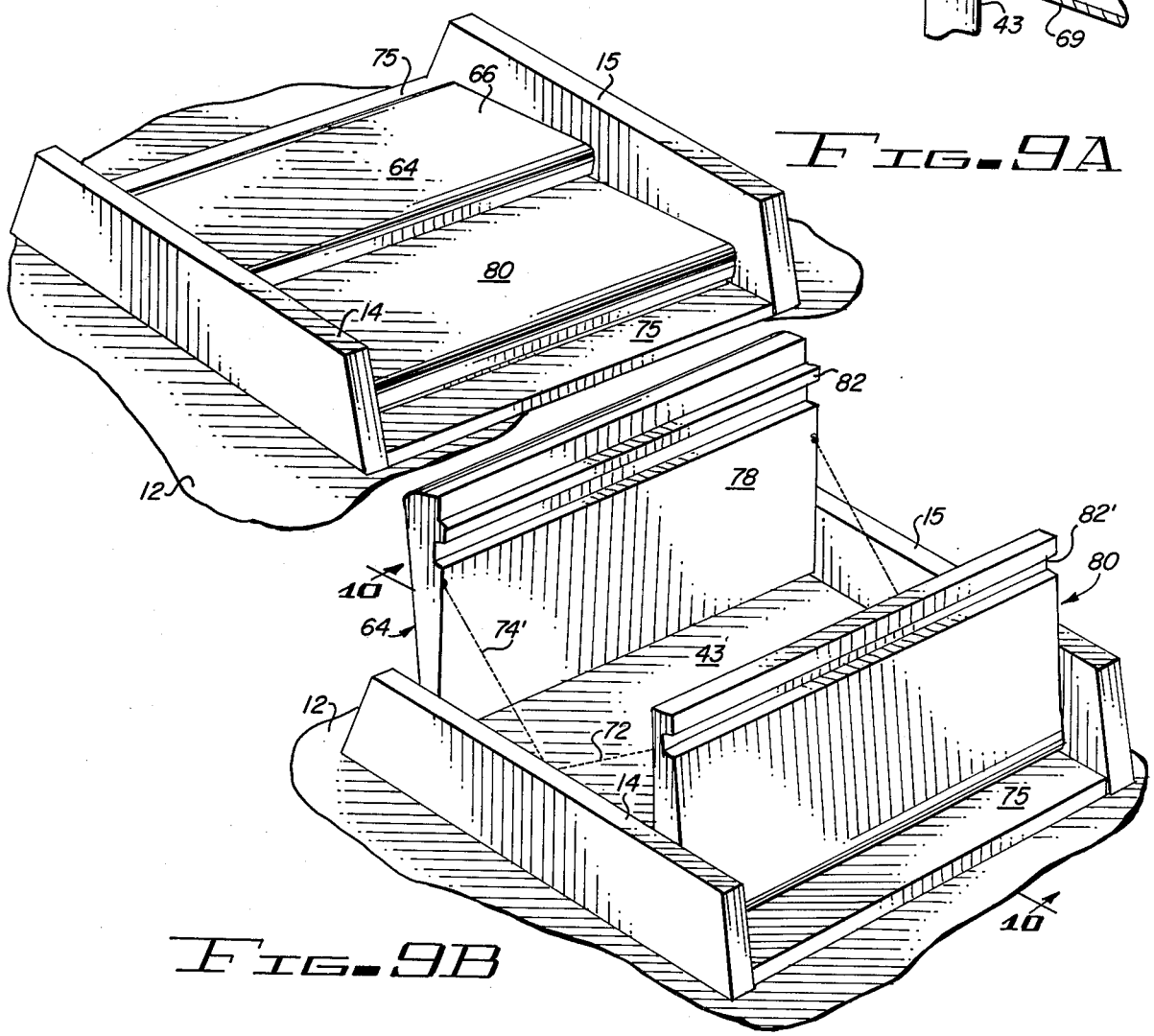
FIG-9A
FIG-9B

SOLAR COLLECTOR AND HEAT AND COLD GENERATOR

BACKGROUND OF THE INVENTION

This invention is a continuation in part of U.S. application Ser. No. 855,213 filed Nov. 28, 1977, now abandoned.

Because of the conscious consumption of energy at this time, recent years has shown increased development of solar energy devices, both here in the U.S. and elsewhere. This has resulted in a great potential for continuing improvement in these devices, particularly collection and heat and cold generation devices embodying reduced manufacturing costs, improved thermal efficiencies, and reduced operating costs.

One such device known as a flat plate collector is generally made with one or more layers of glass suspended over a blackened metal plate in an insulated box. A dead air space is provided between the layers of glass and between the plate and the glass. Air, water or other fluids pass through tubes attached to the metal plate to remove the solar thermal energy generated by these tubes and plate. The layers of glass act as a heat trap, letting in the sun's rays but keeping most of the heat generated in the tubes and plates from escaping again.

DESCRIPTION OF THE PRIOR ART

U.S. Pat. No. 3,563,305 discloses shallow flexible plastic water bags on a flat roof of a structure over which rigid insulated panels can slide back and forth to expose or shut off the water bags to the night or day, winter or summer sky. The bags are supported by and in direct contact with a metal ceiling. When exposed to the winter sun during the day, the water in the bags absorbs heat. At evening, the insulated panels are pulled across and above the bags causing all heat in the water to radiate downward into the rooms below.

In the summer during the day, the insulated panels are pulled over the water bags during the day, preventing solar heat from reaching the water. The water absorbs heat from the rooms below. At night the insulated panels are pulled back and the heat in the water is radiated out into the night sky. By each morning, the water temperature has dropped below room air temperature, thus preparing for a re-absorption of room air for re-heating during the following day.

Major disadvantages of the conventional flat plate collector is that it must be very large in order to collect sufficient energy, the large size resulting from the limited amount of water or fluid in the tubes, the limited amount of sun's energy reaching the earth's surface, the rate at which the fluid moves through the tubes, and the elbows, bends and turns, creating resistance through which the water must overcome in its movements. They generally are also less efficient because thermal heat is transferred from plate to tube wall, to their internal fluids (or to air) to be heated with heat efficiency loss occuring because heat generated in the plate is not right at the fluid in the tube. Flat plates can collect just so much diffuse radiation from the sun per square foot of absorbing surface with known installations.

Another disadvantage is that the flat plate collector generally does not create the concentration of sun's rays at a localized point as needed for higher temperatures for the most effective heating of the fluid and the conversion of water to steam as required in certain solar-to-electrical conversion processes.

Higher temperatures have been created by development of concentrating collectors, using parabolic reflectors along with sun-tracking mechanisms in connection with various schemes for collecting, converting and the utilization of solar energy. Variations of such equipment are described in U.S. Pats. 3,713,727 and 4,000,734. These heat generation devices, particularly of the type adapted to collect cold or heat, have generally been constructed either with a series of tubes embedded in a flat reflective surface (flat plate) or have comprised a curved or semi-cylindrical reflector with a round tube mounted at approximately its focal point with U.S. Pats. 1,946,184 and 3,321,012 being representative of such concentrating structures. Relative to this latter form of the prior art, fins or vanes have been mounted about the tube in an effort to obtain more efficiency from the unit.

At best, the prior art concentrating heat exchangers incorporate thereinto an elaborate system of electrically driven gears and racks or other means to shift or otherwise change the positions of the exchange or collector unit so that its relative position to the sun will remain constant, as the latter tracks across the sky. In addition, their heat generating drops way off on a cloudy day. Another disadvantage of most all types of collectors is that they must be angled or mounted to be approximately normal to the sun. This is different for each latitude.

One of the major disadvantages of the fluid pond roof structure as disclosed by the Hay patent identified above is the short life of the flexible plastic due to the sun's ultra-violet rays, the dirt fouling possibilities of the track system for the moving insulating panels, the gutter needs at the sliding track system to carry off rainwater, the lack of swift positive rainwater drainage off the flat insulated panels, the possibility that rainwater will work its way down to the ceiling of the room below, and the aesthetic objections to metal ceilings, among other things.

During the prosecution of the parent patent application the following U.S. Patents were cited as being of interest: Nos. 3,277,883; 1,003,514; 2,625,930; 2,122,821; 1,338,644; 3,369,539; 4,095,428; 4,064,867; 4,076,025.

None of these patents show or disclose the claimed heat or cold exchanger claimed herein which embodies a particular coil configuration in a heat or coil absorbing material.

While such prior art inventions do suggest workable approaches for the realization of the important objectives involved, the particular implementations described in these patents represent features and theories characteristic of most known collectors in that they generally have fallen a little short of what is required and desired for a low-cost and practical system.

SUMMARY OF THE INVENTION

In accordance with this invention claimed, an improved solar energy collector and heat and cold generator is provided, employing a fixed collector which is compact and inexpensive by virtue of its uniquely designed reflectors and useable in a predetermined range of latitudes without modification of construction or position relative to the sun.

It is therefore, one object of this invention to provide an improved solar energy collector, heat or cold generator, absorber, and heat dissipator.

Another object of this invention is to provide a compact and inexpensive roof-mountable solar energy collector that is effective without collector tilt modification.

A further object of this invention is to provide a cooling means for water or fluid at nighttime, using the same equipment as used for heat generation.

A further object of this invention is to provide such an inexpensive solar energy collector which achieves maximum energy collection throughout the day by virtue of its uniquely positioned reflective and heat collective means.

A further object of this invention is to provide an improved solar energy collector which functions effectively when installed anywhere within a range of latitudes without the use of sun-tracking systems.

A further object of this invention is to provide, but not limited to, a scheme where location of this collector and its storage tank are both positioned in a pitched roof such that thermo-syphon movement of the internal fluid of the collector occurs without any circulating pump or the use of fuel to accomplish this function. Such a storage tank location off the floor will eliminate using floor space as in the conventional storage tank location.

A still further object of this invention is to provide a system which eliminates expensive sensing devices, as required where the storage tank is at the same level or below the collector, which monitors fluid temperature in each and energizes the pump to act accordingly.

A still further object of this invention is to provide a lightweight collector on a low roof overhang location such that installation can be simply accomplished at roof edge on a ladder without climbing on the roof and doing possible damage to either.

A still further object of this invention is to provide a means of discharging water from the collector and related piping, at times when freezing might occur or overheating when internal boiling might occur.

A still further object of this invention is to provide a means of closing and stopping air currents from not only absorbing heat from the tank itself in the attic or plenum area, but in so doing, to cut down on heat absorbed from the insulated ceiling below.

A still further object of this invention is to provide an improved solar energy collector and generator which can be installed at any time during or after construction of the building.

A still further object of this invention is to provide a solar collector that can generate heat during the day, and by opening its top, provide cooling to its internal fluid at nocturnal nighttime.

A still further object of this invention is to provide a smaller, compact collector capable of nesting down into a pitched roof structure, fitting into existing or new roof construction rather than on top of roof.

A still further object of this invention is to provide a roof-mountable heating and cooling generator capable of absorbing heat from inside a building and dissipating the heat to outside atmosphere, or vice versa.

Further objects and advantages of the invention will become apparent as the following description proceeds and the features of novelty which characterize this invention will be pointed out, with particularity, in the claims annexed to and forming a part of this specification.

BRIEF DESCRIPTION OF THE DRAWINGS

The present invention may be more readily described by reference to the accompanying drawings, in which:

FIG. 1 is a perspective view of a solar energy collector embodying the invention;

FIG. 2 is a cross-sectional view of FIG. 1 taken along the line 2—2;

FIG. 3 is a cross-sectional view of a building showing a pitched roof-mounted installation of the collector shown in FIG. 1 together with an associated water storage system;

FIG. 4 is an enlarged cross-sectional view of the storage tank of the water storage system shown in FIG. 3;

FIG. 5 is a cross-sectional view of the collector shown in FIGS. 1 and 2 mounted in a metal or concrete-type roof, either flat or pitched;

FIG. 6 is a cross-sectional view of the collector shown in FIGS. 1 and 2 mounted in the parapet wall of a building;

FIG. 7 is a cross-sectional view of the collector shown in FIGS. 1 and 2 mounted on a flat roof or on the ground;

FIG. 8 is a cross-sectional view of the collector shown in FIGS. 1 and 2 mounted solely on the pitched roof overhang of a building;

FIG. 9A is a perspective view of a roof-mounted solar heating and cooling generator installation with its cover closed;

FIG. 9B is a view similar to FIG. 9A with the cover open; and

FIG. 10 is a cross-sectional view of the building as shown in FIG. 9A taken along the line 10—10 with the insulating panels of the heating and cooling generator in fully open position.

DESCRIPTION OF THE PREFERRED EMBODIMENT

Referring more particularly to the drawings by characters of reference, FIGS. 1 and 2 disclose a roof-mountable solar collector 10 having any desirable configuration and dimensions, but shown herein as comprising a box-like frame 11 for mounting in or on a roof 12 of a building 13. An example is shown in FIG. 3. Frame 11 comprises a pair of identical decorative side members 14 and 15, insulation front and back members 16 and 17, respectively, insulation side members 17A and 17B, and an insulation bottom member 18 comprising a first portion 18A perpendicularly arranged to the side, front and back members and a second insulation 18B angularly arranged to the first portion for reasons hereinafter explained, and horizontal framing members 75 dovetailed into vertical framing members 21. Within an opening 19 formed by the bottom, side, and back members of insulation 17, 17A and 17B is mounted a fluid container or vessel 20 having any desirable configuration but shown herein as a triangular-like cross-sectional configuration taken along a plane parallel with its side members 14 and 15, as more clearly shown in FIG. 2. This container may be made of clear, black or translucent ultra-violet ray resistant plastic with fused joints, or glass or metal, to withstand high temperatures. Normally heating takes place within this container. The top is approximately normal to the sun's rays. Optionally, black body plate 85 could be added inside the container on its bottom or made a part of the bottom of the container.

Line 92 represents an interconnecting pipe between 34 and 33, to circulate the water when the power or gelatin 93 is used in the container 20.

As shown in FIG. 2, the framing of sides, front, back and bottom members of the box-like frame 11 are made with suitable materials such as wood 21 and/or composition board 22. Insulation 16, 17, 17A and 17B are adhered to member 21, and insulation 18A is adhered to bottom 22 (similar construction occurs at the sides). Frame 11 fits into an opening in a roof or supporting framework and is secured firmly to roof joists 23 and header boards 24, or other type of roof construction, in any suitable manner by anchoring horizontal framing member 75 to them on all four sides. The underside of bottom 22 can be painted to match the color of the roof overhang if desired therein. Thus, it hardly would be noticed. Suitable known flashing 12A may be used around all sides of the frame 11 and secured to roof 12 of the building to form a watertight seal in a well-known manner.

Frame 11 is closed by a cover 25 which is hingedly mounted on the back member 21 thereof and sealed to frame 11 when closed, with a compressible closed cell or similar insulation 26 placed around and covering the top edges of the sides, back and front member 21 of the frame. This insulation engages with the bottom of the cover when it is in a closed position, as shown in full lines in FIG. 2. Hinged access to collector 10 shall be for any maintenance replacement, cleaning, or access for the cooling mode, as needed. Lock and clasp 73 holds cover 25 down in a closed position, if desired. A small motor or other device can be installed to open this cover at night when desired.

Cover 25 is framed by suitable material, such as wood members 27 (two sides and back), and member 27A (at front), which optionally may be partially surrounded by a right angular shaped metal covering 28 for additional weather protection. Cover 25 further comprises one or two juxtapositioned planes of glass, 29, 29A, which preferably are low in iron content and optionally etched on the top surface. The glass is fastened to members 27 and 27A by long-life, resilient glass mountings 30 held in place by splines 31, securing mountings 30 to wood members 27 and 27A, or similar construction, as shown in FIG. 2, to provide a dead air space 32 therebetween. Member 27A is positioned below glass 29 to allow rainwater to drain off. As noted from FIGS. 1 and 2 of the drawing, the frame and collector components form a low silhouette or profile which may be pre-fabricated and positioned on the roof as a unit with little change in the outline of the roof or forming an obnoxious projection. Units could be installed side by side, depending on engineering needs of hot fluid. Flashing would cover tops of members 14 or 15. Any gap between the frame of the collector and the roof framing members may be covered with known flashing material and framing members 75, with the collector anchored in place.

Decorative side members 14 and 15 may be employed and styled to cause the collector to more readily blend into the roof configuration. Height would be determined to most effectively permit low angle entry of the sun's rays in the east in the early a.m. and the west in the late p.m.

The fluid container 20 is provided with an intake pipe 33 and an outlet pipe 34, both of which may be formed of suitable ultra-violet resistant acrylic plastic or metal, fused to container 20 at the opening through which they enter or leave the container. Plastic or metal inlet fill pipe 35, cap 36, drain pipe 37 and cap 38 are provided for convenience purposes. A threadedly positioned plastic or metal plug 39 is recessed at the top end inside pipe 37 to permit draining of the fluid in container 20 and prevent outside air temperatures from freezing the fluid at the plug.

An air pocket 40 is maintained in the top of container 20 forming a compressible cushion to reduce or eliminate hammering and problems of fluid expansion. Container 20 is filled or partially filled with water, black powder, gelatin, or similar semi-solid black chemical materials 93.

As shown in FIG. 2, the intake pipe 33 may be part of a continuous pipe-type manifold 41 connecting to other collectors, or storage tank, etc., in a parallel or series fashion depending on the use requirements of the hot fluid employed in the system.

The inside surfaces of insulation 17A, 17B, 18A and 18B are optionally lined with a reflective material 42, such as foil, or black body metal, which is fastened or adhered to the insulation, forming the periphery of the opening for reflecting the sun's rays toward the inside of container 20, or if the black body, re-radiating heat toward the center of container 20, by the change of ray's spectrum to infra-red, the same as occurs with black body bottom plate 85. This material also separates the inner high temperature chamber from the frame 11, thereby preventing the high temperatures from causing any impregnated resins in the wood (if used) from oozing out and staining the underside of the glass of the structure and container 20.

Container 20 could be modified as follows

A. Removal of pipe line 92 installed between inlet 33 and outlet 34. The container top is made of clear glass or plastic with sides 42 and bottom plate being of reflective material. The sun's rays pass through the top of container 20 and are reflected off sides 42 all to black bottom plate 85 traveling through the water partially heating it. Upon hitting black bottom 85, the rays are changed by the bottom plate 85 into infra-rd and heat radiates directly off into the water. Water circulates through container 20.

B. Container 20 could be provided with black body metal or material on its sides and back. In this embodiment the sun's rays would pass through the top of container 20 and are changed to infra-red by the sides and bottom of container 20 with heat radiation directly off into the water within. Line pipe 92 is omitted.

C. In a third embodiment container 20 could be modified with its top formed of black body material such as metal, as well as all of its sides. When the sun's rays hit its top, infra-red heat is created and radiates directly into the water below. In this case, some heat will radiate into the air space between the top of container 20 and the glass above.

D. In this embodiment container 20 contains black powder 93 or gelatin, its top is either a black body metal, or clear plastic, either transmitting heat and sun's rays into container 20. The sides and bottom of container would be ordinary plastic or metal. Line pipe 92 would be added to circulate the water through material 93 without mixing with it. With a clear plastic top to container 20, the sun's rays travel through, hit black powder or material 93 where infra-red heat is then generated which heats the water traveling the pipe 92. With the top of container 20 of black body metal, both it and the powder will create heat to convey to pipe 92.

For those requirements where chilled water is needed, with the addition of a timing device, at night cover 25 hinges open by the motor, exposing container 20 to the cooler nocturnal night air. During the night, the reverse process takes place in that cooler air now enters the air space between cover 25 and container 20, and chills water or black powder 93. If black powder 93 is used within container 20, it chills the water within line 92. In either case, chilled water can be drawn off at drain pipe 37 as needed.

41A represents an insulated cover that could come with and form a part of collector 10 which is hinged at 41B. After final installation of collector 20 and lines 33 and 34 to building lines 46 and 46A, respectively, shown in FIG. 3. hinged cover 41A would be locked up in position, providing insulation around said lines. Line 41 could be installed as a manifold line, connecting several collectors. Also, in event of any future leaking at this joint assembly, this insulated cover can be again dropped to expose the leaky joint for correction from below. The same dropping effect would occur in the structures shown in FIGS. 6, 7 and 8. Line 41 would also include a manual shut-off valve in line 46 and 46A, so that container 20 could be entirely removed without water draining out of tank 45, as shown in FIG. 3.

It should be noted that it is desirable to provide a collector and heat and cold generator unit that may be installed on buildings in this hemisphere between the states of Florida and North Dakota (or comparable latitudes in the southern hemisphere), without substantial construction or tilt modifications and still receive the sun's rays. Thus, the unit may be mass produced for country-wide installation without modification. Any sun's rays at any angle within these latitudes will strike the collector container and/or be reflected into it. The sun's rays for the North Dakota latitude is represented by arrows 70 shown in FIG. 2 while the sun's rays for the Florida latitude and particularly the Miami area are represented by arrows 71. This characteristic of this collector claimed is unlike the known collectors which require a more defined angle so as to be normal to the sun's rays depending on the latitude of the installation. The claimed collector shown and described herein will have its inner container and reflective surfaces exposed to the sun's rays directly in a low pitched roof in the North Dakota latitude as a comparable installation and the same angle in Florida or any latitude or pitched roof slope therebetween. It should be noted that a low pitched roof is one in which a two foot drop occurs for each twelve feet of horizontal roof length. A high pitched roof might drop six feet in the same twelve feet. Various sloped roofs between these are commonly used. It could also be mounted on the ground or stand without varying the tilt.

Although the size of the collector unit is not limited by this disclosure, a number of like or different size units may be installed in a series of "parallel" or "series" fluid flow arrangement on the roof of one or more buildings and fall within the scope of this invention. One type of installation is described as follows and is claimed as an additional feature of this invention (but not limited to):

As shown in FIG. 3, the collector 10 of FIGS. 1 and 2 may be connected to a reservoir or insulated hot water storage tank 45 of any horizontal size and shape and positioned at any suitable place in or near the building it is serving. As shown in FIG. 3, the tank can be located in the building at the highest point in the apex of the roof than the solar collector, distributing the tank weight over numerous structural roof members. This provides a greater slope for fluid lines 46 and 46A, than U.S. Pat. No. 1,242,511, interconnecting the tank with the intake and outlet pipes 33 and 34 respectively of the solar collector 10. Line 47 represents direct cold water supply into the system under public pressures and temperatures (in contrast to Pat. No. 1,242,511).

As the water or fluid is heated in container 20 it rises upward in line 46A to the storage tank 45 and the colder water in the bottom of tank 45 falls downward in line 46 to container 20 to be reheated again.

In the installation disclosed, the hot and cold fluid lines 46A, 46 slope upwardly to tank 45 at a rate such that the hot fluid will rise in the lines after heating with circulating water from tank 45 returning to the solar collector 10 through fluid line 46 far more rapidly than in the structure shown in U.S. Pat. No. 1,242,511. This constant circulating action occurs without the need of a special pumping action.

Optionally, multiple drop supply lines 47 can be installed anywhere along the length of the tank, thus furnishing hot water where needed in the building with shorter distances from the point at which it is needed to storage tank than conventional hot water routing lines. Then, insulating this piping will result in hotter water, quicker than a conventional system.

Air pocket 47B in top of the tank not only provides a cushion against water hammer but should provide a smoother hot water pressure at the faucet as needed.

Even with attic or plenum air circulation through end attic air vents 48, shown in FIGS. 3, the hotter summer temperature environment up in the apex 49 of building 13 lessens hot water tank losses due to the small difference between apex air and tank water temperatures. For example, water in the tank 45 may reach 160 degrees F. and the air temperature in the apex of the building may reach 140 degrees F. with only a 20 degree F. temperature difference.

In the winter, the temperature difference between tank water and attic air will be less, because in the winter season the attic vents 48 (if used) may be closed manually (or with a thermostat operating an electric motor 51) to create a dead air space in the attic, thereby conserving heat in the air in the attic, thus maintaining as small a temperature difference as possible between the water in the tank and the attic air temperature. Heat losses due to convection is thus largely stopped.

It should be noted that if outside air conditions should drop to a temperature that would freeze water, thermostat 90 actuates valves 87 and 52 to close, open air vent valve 91, open valve 88 to drain lines 46 and 46A and container 20 to ground through lines 89 (or into public disposal system). This could be set up on a timer.

When outside air temperature rises, thermostat 90 closes air valve 91, opens valves 52 and 87, closes valve 88, and lines 46, 46A and container 20 refills with cold water from tank 45 again.

In case of boiling temperatures generated in collector 10, thermostat 90 senses approach of boiling temperature, and at a lower temperature, opens valve 88. The boiling water discharges to ground through line 89, and makeup water enters collector through line 46. When temperature in collector water drops, thermostat 90 closes valve 88.

Of course, if cloudy and cold weather conditions are severe enough, a gas or electric heat element could be included in tank 45 for heating purposes.

Check valve 86 could be located in such a position in lines 46 and 46A such that hot water would not be drawn out of tank 45 at night when collector water is cold but not at a freezing temperature.

As noted from FIGS. 3 and 4, a tank relief valve and vent 53 may be provided for safety purposes extending through the roof 50A of building 13 and water supply line 47A for maintaining a given water supply. Optionally in a hot climate if extremely hot water approaching steam is generated in the collector, it will travel up into tank 45 and be tempered with the hot water there, if at a lesser temperature. If water in storage tank and collector reaches steam temperature, line 75A with thermostat and solenoid or similar device in it would open a valve drawing excess hot water down therethrough to the outside or into a waste sink or similar receptacle to be transmitted to a sewer and automatically closing when tank water temperature drops.

FIGS. 5–8 disclose various ways of mounting the solar collector 10 shown in FIGS. 1 and 2 on the roofs of various buildings. Members 14 and 15 can be omitted in these examples. FIG. 5 discloses the solar collector 10 mounted entirely in a metal or concrete roof 55 having a curb 56 running around the opening in the roof in which the collector rests. The manifold 41 would extend parallel to and continuous past any bank of collectors 10. Connection of manifold 41 may or may not be made to tank 45 as shown in FIG. 3 depending on building construction but may be connected in some other method. Insulated hinged cover 41A would fit in alternate position as shown.

FIG. 6 illustrates the solar collector 10 mounted on a parapet wall 57 of a roof 58 of a building supported by a bracket 59 secured to the wall.

FIG. 7 illustrates a way of mounting the solar collector 10 on a flat roof (or ground) 60 by means of a suitable pedestal 61 anchored to solid base 63 and bracket 62 to which collector 10 is anchored.

FIG. 8 illustrates a way of mounting the solar collector entirely on the roof overhang 64 of a building 13 where 50 represents the exterior wall.

In FIG. 3, future access to manifold 41 and insulated cover 41A is solely through attic space of roof plenum. In FIG. 8, the access to both is from outside the building below the roof's overhang 64. If the roof overhang is sufficient, FIG. 8 position of the solar collector is more desirable because of lower height relative to tank 45, and easier future access to manifold 41 and/or related joints rather than the close quarters at roof/wall junction, as shown in FIG. 3. Further, any potential future leak of rainwater through flashing 12A would drip outside and not through to ceiling below. In contrast, standard conventional flat plate collectors must be bolted to roof with the existing possibility of rainwater seeping through bolted connections to insulation and ceiling below.

In addition, the entire collector could be mounted on the ground or floor in a similar fashion.

Any additional controls, thermostats, valves, relief vents, and so forth, as required for monitoring, convenience, necessity or codes shall be assumed a part of this invention and included as required.

FIGS. 9 and 10 disclose a roof mountable fluid pond (or powder) heating and cooling generator having any desirable dimensions and configuration, but shown herein as similar to the collector box-like frame 11, for mounting in or on a roof 12 of a building 43. Frame 11 comprises four identical side members 21, four identical side insulation members 17 with shiny foil or metal faces 42 facing into the generator. Horizontal framing member 75 runs continually around all four side members 21, dovetailing and interlocking into same.

Within an opening 19 formed by the four side insulation members 17 is mounted a fluid container or vessel 20 having any desirable configuration, but shown herein as a rectangular-like cross-sectional configuration. Completely sealed, the top projects past the container and laps over member 17 and 21 on each of the four sides 43. This container may be made of black, clear, or translucent unlta-violet ray resistant plastic, or metal, with fused joints to withstand high temperatures. Fluid would be poured into the container after generator installation through an opening at the top corner. Air space 40 would be maintained, if required, for expansion and contraction of the fluid. The fluid would be any liquid of viscosity and specific heat suitable for the job, or a powder could be poured into container 20 with the same properties, achieving the same results. Frame 11 fits into an opening in a roof or supporting framework and is secured firmly to roof joints 23 and header boards 24 in any suitable manner by anchoring horizontal framing members 75 to them on all four sides. Closure trim 68 can be attached around on all four sides, if desired, to provide a finished transition from ceiling finish 69 and the bottom plastic 79 of container 20. The same type of flashing 12A would be used around all sides of frame 11 as in the collector adaptation.

Frame 11 and container 20 is closed by two insulating covers 64 and 80 instead of the glass cover as in the collector. Each cover is anchored to the top and bottom framing member 21 with spring loaded hinges 65, or similar device designed and installed to maintain the covers in an open position as in FIG. 10, or a motor 81 can be connected to a cam drive to mechanically open the covers using simple hinges.

Covers 64 and 80 are of a configuration similar to that shown and are designed and shaped to direct rainwater downwards off a unit when in a closed position. Their top surfaces and edges would be of a suitable durable waterproof, untra-violet resistant coating 66. When closed, tongue and groove configuration 82 would fit together for thermal seal as well as for creating a dam against rainwater running back up under cover 64 and getting inside the generator.

Each cover would be constructed of suitable rigid insulation to provide the necessary thermal barrier. The underside of cover 80 would be covered with any suitable coating.

The underside of cover 64 would be covered with a shiny foil or metal 78 to direct additional sun's rays 70 and 71 depending on the latitude into container 20 and into the liquid or powder therein.

Units could be installed side by side, depending on engineering needs. Size would also be variable, depending on needs and practicality, especially as suitable for replacing components if required in the future.

When covers 64 and 80 are in open position, diffused light 44 could stream through the top clear cover of container 20, and if the contents inside are a clear fluid, they pass through it, through bottom 79 and into the room as a skylighting means.

Cables 74' on each side of cover 64 would pass around small pulleys 74 on each side connected to motor 81. Cables 72 on each side of cover 80 would pass around larger pulleys 76 on each side, also connected to motor 81. Size of pulleys and their position would all be such that when the light sensor actuated the motor, the latter would wind the cables on the pulleys simultaneously. Cover 80 would close just ahead of cover 64.

Decorative side members 14 and 15 could be installed for same aesthetic appearance as in the collector design. View 77 would be the angle of eyesight from ground level, past cover 80 to block seeing cover 64. Surfaces 42 additionally help to direct the sun's rays into the fluid. If a powder were used instead of the fluid, these surfaces would not be needed and would be omitted.

A ceiling well could be constructed for building design using a flat ceiling, pitched roof and/or attic. The ceiling and well walls would be insulated and help contain heat movement through the well.

Although but a few embodiments of the present invention have been illustrated and described, it will be apparent to those skilled in the art that various changes, modifications and construction details may be made therein without departing from the spirit of the invention or from the scope of the appended claims.

What is claimed is:

1. A compact solar heat generator, useable in a predetermined range of latitudes, comprising:
   (a) a frame having an open top, insulated bottom and side walls defining a chamber, said frame having interior reflective faces for receiving and redirecting solar rays to a location within the chamber;
   (b) a closed container having a wall and at least one surface permitting passage of solar rays and at least one heat generating surface at or adjacent said container wall, said one surface being oriented relative to said top and said reflective surface to receive through said one surface both direct and reflected solar rays to transfer energy to the interior of said container, said container being thermally insulated from the generator surroundings and positioned within said chamber at said location and further having fluid inlet and outlet ports for circulating a fluid to be heated through said container;
   (c) a transparent cover for said frame secured to said frame, said cover and frame inclined to be approximately normal to the sun's rays when mounted; and
   (d) said frame being mountable at a given angular position for receiving solar rays.

2. The solar collector heat and cold generator set forth in claim 1 wherein:
   said cover comprises a pair of spacedly and parallelly arranged transparent plates having a dead air space therebetween.

3. The solar collector heat and cold generator set forth in claim 1 in further combination with:
   a fluid storage tank for mounting in a upper plenum area of a building and having inlet and outlet ports, and
   pipe means for interconnecting said inlet and outlet ports of said tank respectively with said inlet and outlet ports of said container.

4. The solar collector heat and cold generator set forth in claim 3 in further combination with:
   with valve means connected in said pipe means,
   drain means connected to said conducting member, and
   a timer for actuating said valve means and said drain means at preselected times.

5. The solar collector heat and cold generator set forth in claim 1 wherein:
   the bottom of said container is at least partially covered with a black surface.

6. The generator of claim 1 in which the interior reflective surface and container surface permitting passage of light are configured so that a substantial portion of the sun's rays throughout a range of latitude will strike the container or be reflected therein when the generator is mounted on an inclined surface without modification of the said surfaces or tilt angle.

7. The solar heat generator of claim 1 wherein said heat generating surface is a black body surface which is energy-absorbing.

8. The solar heat generator of claim 1 wherein at least one of said container walls or said heat generating surface is adapted and oriented approximately normal to the sun's rays at a predetermined range of latitudes.

9. A compact solar heat generator comprising:
   (a) a base having an insulated bottom wall defining a chamber;
   (b) a closed fluid container having walls and having at least one surface permitting passage of solar rays, said container being within said chamber and insulated by said insulation from the generator surroundings and further having fluid inlet and outlet ports for circulating a fluid to be heated through said container;
   (c) a black body absorber surface at one wall of said fluid container;
   (d) a reflective surface extending over said base said surface positioned to receive and redirect solar rays to said black body surface to transfer energy to the interior of said container through said one surface; and
   (e) transparent cover over said base, said base and cover inclinable to be approximately normal to the sun's rays when mounted wherein fluid is heated in said container by direct absorption and conduction from said absorber surface.

10. A compact solar heat generator comprising:
    (a) a frame having open top, insulated bottom and side walls defining an interior chamber, said frame having at least one reflective face for receiving and re-directing solar rays to a location within the chamber;
    (b) a closed container having a bottom and side walls and an upper surface permitting passage of solar rays and having a generally triangular-like shape in vertical cross-section and further having at least one heat generating surface at or adjacent said container bottom, said upper surface being oriented to the top of the frame and the said reflective surface to receive through said upper surface both direct and reflected solar rays entering said chamber and to transfer energy to the interior of said container, said container having fluid inlet and outlet ports for circulating the fluid to be heated through said container in immediate contact with said heat generating surface, said container being insulated from the surroundings of said generator by said insulation; and
    (c) a transparent cover for said frame, said cover and frame inclined to be approximately normal to the sun's rays when mounted in most latitudes throughout the world and said cover and said energy receiving surface being in a non-parallel relationship; and
    (d) said frame being mountable at a predetermined angular position wherein fluid is heated in said container by direct absorption and conduction from said absorber surface as the result of a direct and indirect receipt of solar radiation.

* * * * *